United States Patent [19]

Beavis et al.

[11] Patent Number: 5,045,694
[45] Date of Patent: Sep. 3, 1991

[54] INSTRUMENT AND METHOD FOR THE LASER DESORPTION OF IONS IN MASS SPECTROMETRY

[75] Inventors: Ronald C. Beavis; Brian T. Chait, both of New York, N.Y.

[73] Assignee: The Rockefeller University, New York, N.Y.

[21] Appl. No.: 413,321

[22] Filed: Sep. 27, 1989

[51] Int. Cl.$^5$ .......................... B01D 59/44; H01J 49/00
[52] U.S. Cl. ................................... 250/287; 250/288; 250/282; 250/423 P
[58] Field of Search ............. 250/287, 288, 282, 423 P

[56] References Cited

U.S. PATENT DOCUMENTS

| | | | |
|---|---|---|---|
| 4,295,046 | 10/1981 | Grütter et al. | 250/287 |
| 4,296,322 | 10/1981 | Wechsung | 250/287 |
| 4,468,468 | 8/1984 | Benninghoven et al. | 250/288 |
| 4,527,059 | 7/1985 | Benninghoven et al. | 250/288 |
| 4,583,183 | 4/1986 | Winiecki et al. | 250/288 |
| 4,778,993 | 10/1988 | Waugh | 250/287 |

OTHER PUBLICATIONS

Karas et al., UV Laser Matrix Desorption/Ionization . . . 100,000 Dalton Range, (1989), pp. 231-242.
Hillenkamp et al., Matrix Assisted UV-Laser Desorption/Ionization, pp. 1-9.
Hillenkamp et al., On Popping Corn, Erupting Vulcanos, Tasting Wine, Massive Proteins and Related Matters, 1989, pp. 1-8.
Karas et al., Laser Desorption/Ionization Mass Spectrometry of Proteins of Mass 100,000 to 250,000 Dalton, Angewandte Chemie, Jun. 1989, pp. 760-761.
Karas et al., Ultraviolet-Laser Desorption/Ionization Mass Spectrometry of Femtomolar Amounts of Large Proteins, vol. 18 (1989), pp. 841-843.
Tanaka et al., Detection of High Mass Molecules by Laser Desorption Time-of-Flight Mass Spectrometry.

Primary Examiner—Bruce C. Anderson
Attorney, Agent, or Firm—Browning, Bushman, Anderson & Brookhart

[57] ABSTRACT

In mass spectrometry, a time of flight (TOF) mass spectrometer is used to measure the mass spectrum of organic molecules of mass ranging from 200 Dalton to greater than 200,000 Dalton. Ions from the sample are desorbed by striking the probe tip with laser pulses in a spot size, on the tip, in the range of 0.03-3.0 mm$^2$. The time of flight of the ions is measured and displayed with a resolution of the ion molecular signal in the range of 300-500 full width at half-maximum definition (FWHM).

24 Claims, 2 Drawing Sheets

INSTRUMENT AND METHOD FOR THE LASER DESORPTION OF IONS IN MASS SPECTROMETRY

BACKGROUND OF THE INVENTION

1. Field of the Invention

The present invention relates to mass spectrometry and more particularly to the laser desorption of very large organic molecules using a time of flight (TOF) mass spectrometer.

2. Description of the Related Art

Mass spectrometry is an analytical technique for the accurate determination of molecular weights, the identification of chemical structures, the determination of the composition of mixtures and quantitative elemental analysis. For example, it is possible to accurately determine the molecular weights of organic molecules. It is also possible to determine the structure of the organic molecules based on the fragmentation pattern of the ion formed when the molecule is ionized. A quantitative elemental analysis of organic molecules and compounds requires obtaining precise mass values from a high resolution mass spectrometer.

One type of mass spectrometer obtains a mass spectrum by passing the ions (electrically charged atoms or molecules) through a magnetic field. The ions form a beam which, when they are of different masses, are deflected through different angles by the magnetic field. The magnetic field is varied (swept) and, at each field strength, ions pass through precision slits to be measured by an electrical detector (electrometer). However, primarily due to the limitations of magnetic field strength, it is impractical to measure molecules having a mass-to-charge ratio (m/Z) greater than about 15,000.

The organic molecules of greater mass which are non-volatile and thermally labile (decomposed by heat) are of great medical and commercial interest, as they include, for example, proteins, DNA, oligosaccharides, commercially important polymers and pharmaceuticals.

It has been suggested, in a series of articles published by "Hillenkamp-Karas", cited below, that large organic molecules, of about 10,000–100,000 Daltons, may be analyzed in a time of flight (TOF) mass spectrometer. Those articles describe that the molecules of interest are dissolved in an aqueous solution of nicotinic acid, in a ratio of one molecule of interest to 1000 nicotinic acid molecules. The solution is dried and placed on a sample probe tip that is inserted into a TOF mass spectrometer. The dried material on the tip is searched, using a microscope, for a suitable spot, and that spot is activated by a laser beam ("microprobe"). The laser beam wavelength is in the UV (ultraviolet) region (266 nm wavelength) and the beam size at the tip is 8 um diameter (Hillenkamp 1) or 10–50 um (Karas, 2,3). The molecules are desorbed and ionized by the laser beam and are formed into beams by a series of electrodes creating an electric field, typically of 1000 volts/cm. The ion beam is directed down a tube which is a vacuum chamber (spectrometer tube), generally having an equilibrium pressure in the order of $10^{-6}$ mm mercury. Ions of different masses require different times to transverse the spectrometer tube. The time the tip (target) is struck with a laser pulse is taken as time zero and the various times the ions arrive at the opposite end (the ion detector) are measured and displayed generally on a graph (the mass spectrum).

The frequency of the laser is chosen to match the absorption frequency of the solid matrix, principally of nicotinic acid, which exhibits strong absorption at 266 nm wave length. The laser pulses, of 15 ns pulse width and 266 nm wavelength, are obtained from a frequency quadrupled Q-switched ND-YAG solid crystal laser instrument.

The "Hillenkamp-Karas" articles are the following:

1. Hillenkamp, "Laser Desorption Mass Spectrometry: Mechanisms, Techniques and Applicatons"; *Bordeaux Mass Spectrometry Conference Report*, 1988, pages 354–362.

2. Karas and Hillenkamp, "Ultraviolet Laser Desorption of Proteins Up to 120,000 Daltons", *Bordeaux Mass Spectrometry Conference Report*, 1988, pages 416,417.

3. Karas and Hillenkamp, "Laser Desorption Ionization of Proteins With Molecular Masses Exceeding 10,000 Daltons", *Analytical Chemistry*, 60, 2299, July 1988.

4. Karas, Ingendoh, Bahr and Hillenkamp, "UV-Laser Desorption/Ionization Mass Spectrometry of Femtomol Amounts of Large Proteins", *Biomed. Environ. Mass Spectrum.* (in press)

Although the previously described Hillenkamp-Karas articles are a real advance in the field, there are a number of problems and limitations to the methods.

The resolution of the mass spectrum is not as sharp as is possible, at much lower molecular weights, with magnetic field mass spectrometry. The Hillenkamp-Karas graphs show what appear to be a broad envelope of mass weights rather than the sharp peaks, which are desired. The work so far published by Hillenkamp and Karas on nicotinic acid assisted UV laser desorption shows spectral peaks with resolutions of less than about 50 Full Width at Half-Maximum definition (FWHM).

In addition, the procedure is time-consuming and costly. One must obtain a suitable spot on the tip using a microscope, by trial and error, and a number of attempts may be made before a successful spot is found. The instruments required to be used (laser microprobes and LAMMA) are relatively costly and complex. They have only studied positive ions, although negative ions sometimes provide complementary and/or unique information.

The wavelength published by Karas-Hillenkamp, in some cases, presents problems as to some molecules because that wavelength causes undesirable fragmentation of the molecule. It is difficult to simply change the wavelength with the teaching of the Karas-Hillenkamp articles, because the matrix (nicotinic acid) will only effectively absorb laser energy in a restricted range of wavelengths (below about 300 nm).

The use of laser beams in time of flight mass spectrometers is shown, for example, in U.S. Pat. Nos. 4,694,167; 4,686,366 and 4,295,046, incorporated by reference herein.

OBJECTIVES OF THE INVENTION

It is an objective of the present invention to provide a method and apparatus in mass spectrometry which will provide for the analysis of molecules whose mass is in the range of 200–200,000 Dalton, or greater, and including large non-volatile bio-organic molecules.

It is a further objective of the present invention to provide such a mass spectrometry instrument and method which is relatively simple to operate, permits rapid preparation of samples, provides results quickly, and is relatively low in cost.

It is a further objective of the present invention to provide such a mass spectrometry instrument and method which may be used to analyze negative ions as well as positive ions.

It is a further objective of the present invention to provide such a mass spectrometry instrument and method which will cause relatively less fragmentation of the molecules.

It is a further objective of the present invention to provide such a mass spectrometry instrument and method which may be used with relatively small samples, of the order of 0.01 picomole, and which will provide reproducible sample layers.

It is a further objective of the present invention to provide such a mass spectrometry instrument and method which are able to analyze samples which are mixtures of materials.

It is a further objective of the present invention to provide such a mass spectrometry instrument and method which are able to analyze large organic molecules in addition to proteins, for example, DNA, polymers, glycolipids, glycoproteins, oligosaccharides, etc.

SUMMARY OF THE INVENTION

In accordance with the present invention, there is provided a system and method in mass spectrometry for the mass analysis of non-volatile large organic molecules in the range of 200–200,000 Dalton, or greater.

The instrument is a time of flight (TOF) mass spectrometer. The organic molecule material, to be analyzed, is dissolved in a solution containing a matrix, preferably a cinnamic acid analogue such as caffeic acid, syanpinic acid and ferulic acid. In one method, the matrix material and sample is deposited as a thin layer on the metal tip of a probe. The probe is inserted into the mass spectrometer and the tip is irradiated with a UV laser beam at the wavelength of 200–600 nanometers, preferably 330–550 nm, and pulses of 1–20 ns pulse width, to form a relatively large laser spot on the tip, in the range of 0.03–3.0 mm$^2$ and most preferably in the range of 0.1–1.0 mm$^2$.

The spectrometer has a plate and gridded electrodes to form an electric field which is switched to be either positive or negative and to thereby form a beam of either positive or negative ions released by the laser. The times of flight of the ions are displayed on a graph exhibiting the relatively high resolution and low noise possible using the present invention.

BRIEF DESCRIPTION OF THE DRAWINGS

Other objectives of the present invention will be apparent from the following detailed description taken in conjunction with the accompanying drawings, in which.

DETAILED DESCRIPTION OF THE INVENTION

The following specific description is of a suitable embodiment of the present invention and its materials, voltages, etc. is illustrative of the invention and not intended to be limiting as to the scope of the invention.

Figure 1:
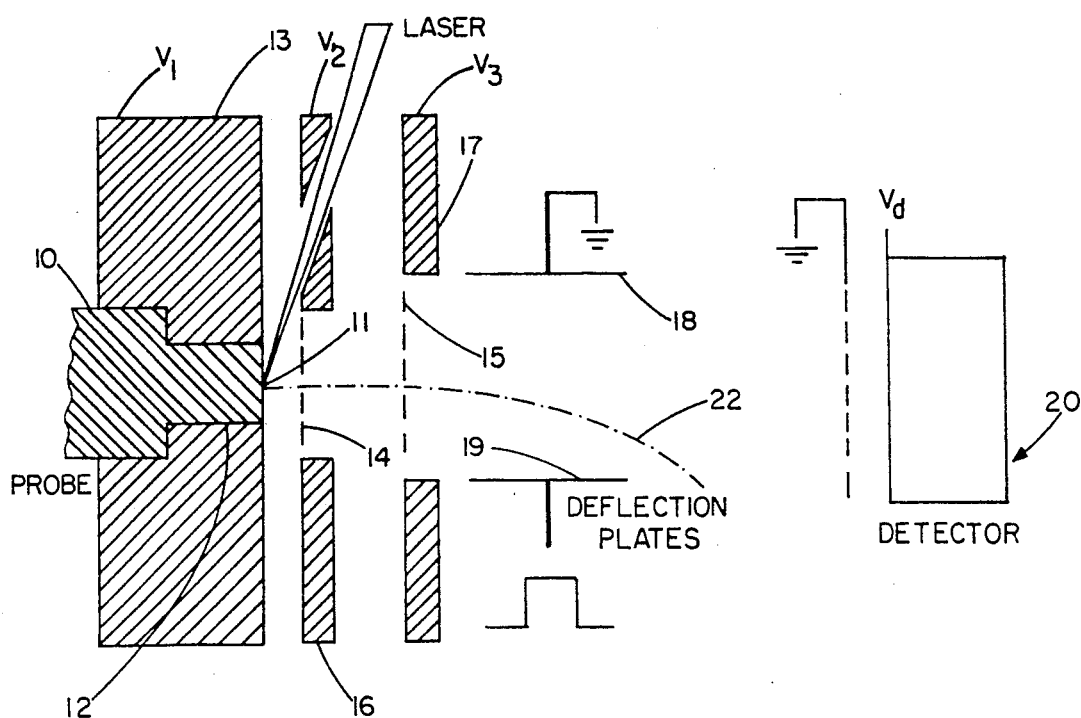
FIG. 1 is a diagram of the system of the present invention.

The present invention utilizes a time of flight (TOF) mass spectrometer of the type illustrated in FIG. 1. The probe 10 is of platinum metal and has a flat face 11 which is round in cross-section and has a 2 mm diameter. The probe 10 is manually inserted and may be manually removed from the round bore 12 of the metal wall 13 of the spectrometer. The wall 13 is at voltage $V_1$.

The ions extracted from the face 11 of the probe are attracted and pass through the grid covered holes 14, 15 in the metal plates 16, 17 respectively. The plates 16, 17 are at voltages $V_2$ and $V_3$. Preferably $V_3$ is at ground and $V_1$ and $V_2$ are varied to set the accelerating electrical potential, which typically is in the range of 15,000–50,000 volts. A suitable voltage $|V_1-V_2|$ is 5000 volts and a suitable range of voltages $|V_2-V_3|$ is 10,000 to 45,000 volts.

The low weight ions are generally numerous and may swamp the detector 20. They are almost entirely prevented from reaching the detector 20 by the deflection plates 18, 19. The ions travel as a beam between the deflection plates 18, 19, which suitable are spaced 1 cm. apart and are 3–10 cm long. Plate 18 is at ground and plate 19 receives square wave pulses, for example, at 700 volts with a pulse width in the order of 1 microsecond after the laser strikes the tip. Such pulses suppress the unwanted low mass ions, for example, those under 10,000 Dalton, by deflecting them, as shown by 22, so that the low weight ions do not reach the detector 20, while the higher weight ions pass between the plates 18, 19 after the pulse is off, so they are not deflected, and are detected by detector 20.

An ion detector 20 is positioned at the end of the spectrometer tube and has its front face maintained at voltage $V_d$. The gain of the ion detector 20 is set by $V_d$ which typically is in the range of −1500 to −2500 volts. The detector is a chevron-type tandem microchannel plate array.

The spectrometer tube is straight and provides a linear flight path, for example, ½–4 meters in length, preferably about two meters in length. The ions are accelerated in two stages and the total acceleration is in the range of about 15,000–50,000 volts, positive or negative.

The spectrometer is held under high vacuum, typically 10 μPa, which may be obtained, for example, after 2 minutes of introduction of the sample.

The face 11 of the probe is struck with a laser beam to form the ions. Preferably the laser beam is from a solid laser. A suitable laser is an HY-400 Nd-YAG laser (available from Lumonics Inc., Kanata (Ottawa), Ontario, Canada), with a 2nd, 3rd and 4th harmonic generation/selection option. The laser is tuned and operated to produce maximum temporal and energy stability. Typically, the laser is operated with an output pulse width of 10 ns and an energy of 15 mJ of UV per pulse. To improve the spatial homogeneity of the beam, the amplifier rod is removed from the laser.

The output of the laser is attenuated with a 935-5 variable attenuator (available from Newport Corp., Fountain Valley, Calif.), and focused onto the sample on the face 11, using a 12-in. focal length fused-silica lens.

The incident angle of the laser beam, with respect to the normal of the probe's sample surface, is 70°. The spot illuminated on the probe is not circular, but a strip of approximate dimensions 100×300 um (measured by burn marks on paper). The start time for the data system (i.e., the time the laser actually fired) is determined using a beam splitter and a P5-01 fast pyroelectric detector (available from Molectron Detector Inc., Campbell, Calif.). The laser is operated in the Q switched mode, internally triggering at 5 Hz, using the Pockels cell Q-switch to divide that frequency to a 2.5 Hz output.

The data system for recording the mass spectra produced is a combination of a TR8828D transient recorder and a 6010 CAMAC crate controller (both manufactured by Lecroy, Chestnut Ridge, N.Y.). The transient recorder has a selectable time resolution of 5-20 ns. Spectra may be accumulated for up to 256 laser shots in 131,000 channels, with the capability of running at up to 3 Hz. The data is read from the CAMAC crate using a Proteus IBM AT compatible computer. During the operation of the spectrometer, the spectra (shot-to-shot) may be readily observed on a 2465A 350 MHz oscilloscope (available from Tektronix, Inc., Beaverton, Oreg.).

This linear TOF system may be switched from positive to negative ions easily and both modes may be used to look at a single sample. The sample preparation was optimized for the production of homogeneous samples in order to produce similar signals from the entire face of the probe tip. The preferred preparation dissolves less than 0.2 g/L of the sample in a 5-10 g/L solution of matrix in water (or 1:1, water+ethanol) and deposits 0.5 μL of the solution on the probe tip.

Compounds useful as matrices for the practice of this invention include organic compounds which absorb above the region at which the DNA bases absorb. Therefore, they should absorb above 300 nm, preferably above 330 nm. As a matter of convenience, it is preferred to utilize compounds which absorb at about 355 nm or higher. The compounds should preferably be solids so that they do not volatilize under the conditions of use. They should not react with DNA under the conditions of use, nor should they decompose to give compounds which do react with DNA.

The presently preferred compounds are cinammic acid derivatives such as ferulic, caffeic and syanpinic acid, all of which are substituted in the phenyl ring with activating groups. Cinammic acid derivatives which absorb above 300 nm and are substituted on the phenyl ring with hydroxyl, alkoxyl, amino, aklylamino, lialkylamino groups in which the alkyl group is preferably methyl or ethyl, but may contain up to six or more carbon atoms are useful.

Those skilled in the art can readily conceive of other compounds which will meet the criteria of this invention. For example, compounds which absorb well above 300 nm and even into the visible or infrared regions of the ulispectrum may be employed. Such compounds may be considered as "based" on cinnamic acid but with longer coordination chains. These would include the α- and B-naphthalene analogues of cinnamic acid, or analogs of these compounds in which the coordination chain of the aliphatic group is extended. Such compounds might be substituted with activating groups. Heterocyclic compounds with the appropriate properties are also included within the scope of the invention.

In addition, the following are suitable matrix materials, particularly from non-DNA organic molecules:
3-Pyridinecarboxylic acid
2-Pyrazinecarboxylic acid
Thymine
3-Methoxy, 4-hydroxybenzoic acid
Thiourea These suitable matrix materials, listed above, are further described in "Factors Affecting The Ultraviolet Desorption of Proteins", Beavis and Chait, *Rapid Comm. in Mass Spectrometry*, Vol. 3, No. 7 (1989), incorporated by reference herein.

Figure 3:
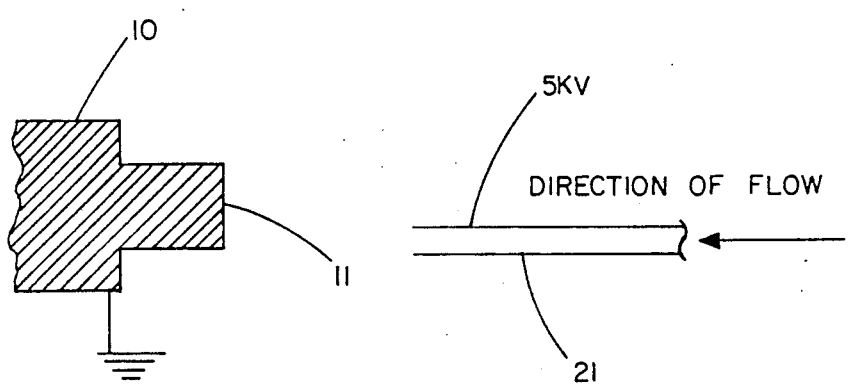
FIG. 3 is a side cross-sectional view of the parts used in the electrospray process.

In one method of sample preparation, the droplets of the sample are deposited on the tip face 11 by electrospray (electrodeposition), see FIG. 3. The matrix material, in this technique, is preferably ferulic acid. The tip is grounded and an electric field, typically of 5000 volts, is created by bringing a charged metal capillary tube 21, through which the matrix material flows, to within 2 cm of the tip face 11. Droplets of the matrix material are attracted to the tip face, i.e., are sprayed thereon, forming a dry, thin, evenly spread layer on the tip face. Then a small quantity, in the order of about 1 p mol, of the organic molecule sample of interest, dissolved in a solvent, is applied to the matrix material layer and dried by a stream of air over the tip.

An alternative sample preparation method is to dissolve the organic molecule in an appropriate solvent and mix with a matrix material, for example, a cinnamic acid analogue. A suitable ratio of organic molecule to matrix is 1:10,000. That mixture of solvent and matrix material is applied to the probe tip and dried with an air stream.

The sensitivity of this technique is very high for proteins. With a typical sample loading of 0.1–20 p mol of analyte on the probe tip (3 mm$^2$) good signals were observed. For most peptides, the optimum signal was produced with a sample coverage of <2 pmol/mm$^2$ on the probe. There should be a $10^3$–$10^4$ molar excess of matrix for optimum detection.

Preferably the laser beam is operated in the UV region or visible region in the range of 320 nm to 600 nm. At laser wavelengths over 300 nm the organic molecules of interest do not absorb the laser energy and are not fragmented, which is highly desirable. A relatively inexpensive nitrogen laser may be used which produces UV at 337 nm or a dye laser may be used. With the ferulic, syanpinic or caffeic acid matrix materials, a satisfactory wavelength, obtainable with the 3rd harmonic from the solid crystal laser described above, is 355 nm.

Figure 2A:
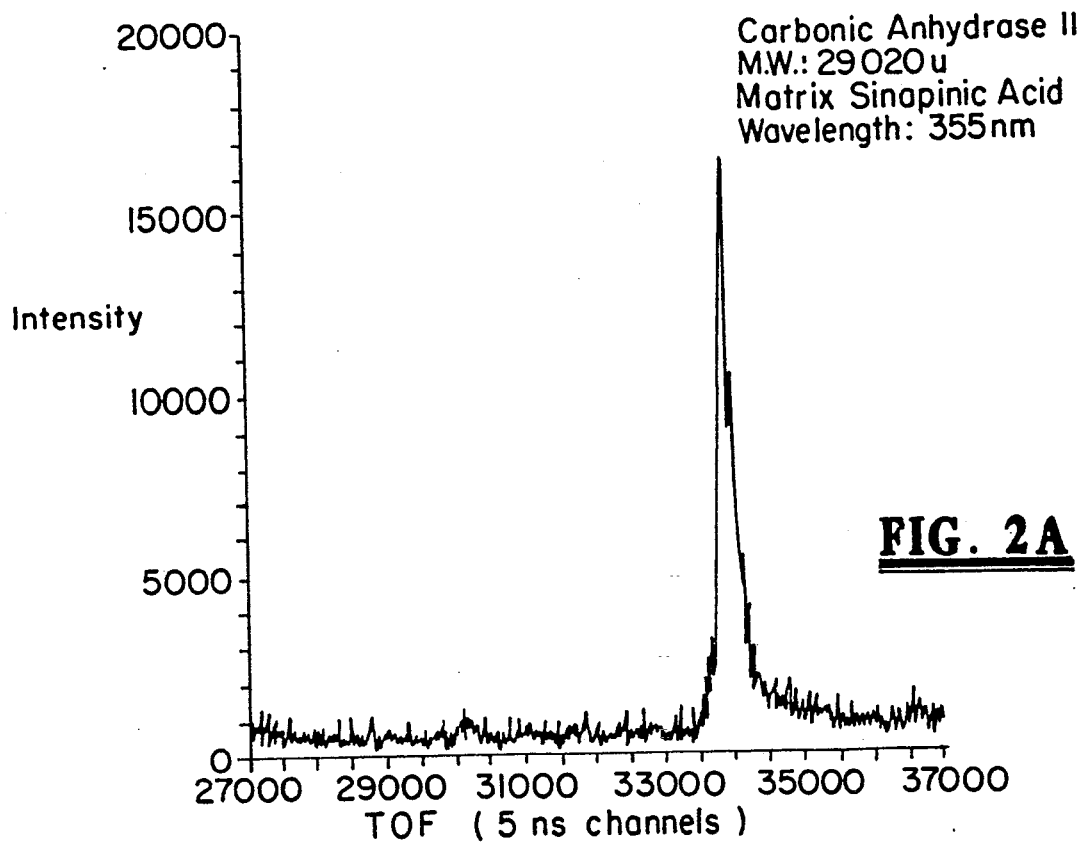
FIG. 2A is a mass spectrum of carbonic anhydrase obtained according to the present invention.

FIG. 2A is a graph of intensity vs. time of flight of the pseudomolecular-ion region of a TOF mass spectrum of the organic molecule carbonic anhydrase 11 from a syanpinic acid matrix at 355 nm wavelength.

Figure 2B:
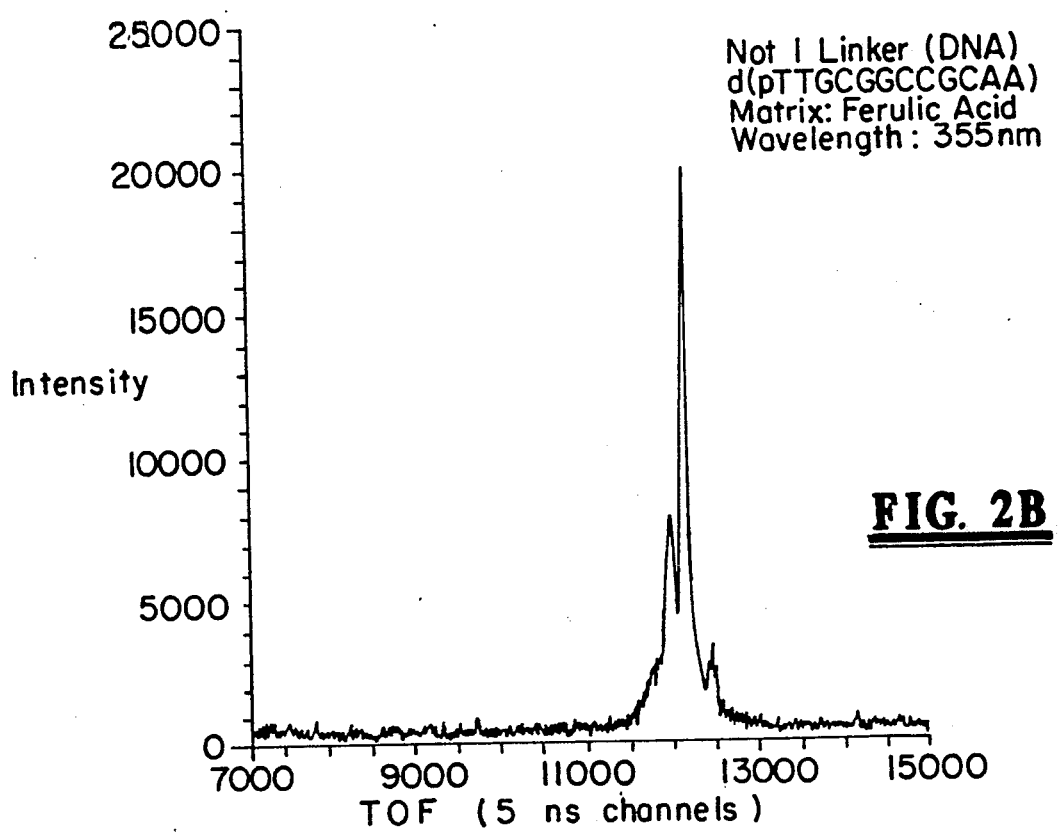
FIG. 2B is a mass spectrum of Not 1 Linker DNA obtained according to the present invention.

FIG. 2B is a similar graph of Not 1 Linker (DNA) in which the matrix is ferulic acid and the wavelength is 355 nm.

What is claimed is:

1. An instrument system in mass spectrometry to measure the mass of organic molecules including:
    (a) a time of flight mass spectrometer means to analyze the mass of said molecules, including a spectrometer tube, vacuum means to apply a vacuum to the tube, electrical potential means within the tube to apply an accelerating electrical potential, and a probe having a tip face, said probe being removably inserted into said spectrometer means;
    (b) laser beam means to produce a laser beam directed at said tip and providing a laser spot on the said tip face having an area in the range of from 0.1–1.0 mm$^2$ to desorb said organic molecules;
    (c) detector means to detect the mass weights with a resolution of the peaks of the ion molecular signals of higher than 50 full width at half-maximum definition (FWHM); and (d) deflection means comprising a pair of spaced-apart deflection electron plates within said spectrometer tube forming an electrical field between the plates to deflect low mass ions of less than 10,000 Dalton so that they do not reach the detector means.

2. A system as in claim 1 and further including a sample means comprising an organic molecule material of mass weight of over 10,000 Dalton in a matrix of a heat absorbent material on said tip face.

3. A system as in claim 1 wherein the organic molecules are absorbed in a thin, evenly coated layer of matrix material on the tip face.

4. A system as in claim 3 wherein the mole ratio of organic molecules to matrix material is in the range of 1:100 to 1:10,000.

5. A system as in claim 1 wherein the organic molecules are absorbed in an electro-deposited layer of matrix material covering the tip face.

6. A system as in claim 1 wherein the accelerating electrical potential produces negative ions of the molecules.

7. A system as in claim 2 wherein the laser has an output pulse width in the 1–10 ns range.

8. A system as in claim 1 wherein the laser has a wavelength in the range of 200–600 nanometers.

9. A system as in claim 1 wherein the laser has a wavelength in the range of 330–550 nanometers.

10. A method in mass spectrometry to measure the mass of organic molecules of over 10,000 Dalton mass weight with improved resolution, including the steps of:

(a) forming a thin and even layer on the probe tip face of the organic molecules absorbed in a matrix of light-absorbent material;

(b) placing the probe into one end of a time of flight mass spectrometer and applying a vacuum and an electric field to form an accelerating potential within the spectrometer;

(c) striking the tip within the spectrometer with a series of laser pulses whose spot sizes on the tip are larger than 0.03 mm$^2$ in area in order to desorb ions of the molecules from the tip; and (d) detecting the mass weights of the ions by their time of flight with a resolution of the molecular ion signal greater than 50 full width at half-maximum (FWHM) and displaying such detected mass weights.

11. A method in mass spectrometry to measure the mass of organic molecules with improved resolution, including the steps of:

(a) spraying a heat responsive matrix material through an electric field by electro-deposition on the tip of a probe to form a thin and even layer of the matrix material on the tip;

(b) applying the organic molecules to the matrix layer.

(c) placing the probe into one end of a time of flight mass spectrometer and applying a vacuum and an electric field to form an accelerating potential within the spectrometer;

(d) striking a spot of the probe tip within the spectrometer with a series of laser pulses to desorb ions of the molecules from the face of the tip; and (e) detecting the mass weights of the ions by their time of flights to a resolution of the molecular ion signal of greater than 50 full width at half-maximum definition (FWHM) and displaying such detected mass weights.

12. A method as in claims 10 or 11 wherein said spot size is in the range of 0.03 to 3.0 mm$^2$ in area.

13. A method as in claims 10 or 11 wherein the area of said spot is in the range of 0.1–1 mm$^2$.

14. A method as in claims 10 or 11 wherein the molar ratio of organic molecules to matrix material is in the range of 1:100 to 1:10,000.

15. A method as in claims 10 or 11 wherein the accelerating electrical potential produces negative ions of the molecules.

16. A method as in claims 10 or 11 wherein the laser has an output pulse width in the 1–10 ns range.

17. A method as in claims 10 or 11 wherein the laser has a wavelength in the range of 200–600 nanometers.

18. A method as in claims 10 or 11 wherein the laser has a wavelength in the range of 330–550 nanometers.

19. A method in mass spectrometry to measure the mass of organic molecules with improved resolution, comprising:

a) forming a layer of organic molecules on a probe tip;

b) placing the probe tip into a time of flight mass spectrometer;

c) applying a vacuum and an electric field to form an accelerating potential within the mass spectrometer;

d) striking the probe tip within the mass spectrometer with a series of laser pulses providing a laser spot having an area in the range of from 0.1 to 1.0 mm$^2$;

e) activating a deflecting field in response to each of the laser pulses to deflect low weight ions passing through the deflecting field away from a detector;

f) deactivating the deflecting field in response to each of the laser pulses to pass high mass weight ions passing through the deflecting field to a detector; and g) detecting the mass weight of the ions reaching the detector.

20. A method as in claim 19, further comprising:
providing a pair of plates to form the deflecting field; and
the steps of activating and deactivating the deflecting field comprise applying square wave pulses to at least one of the plates.

21. The method as in claim 20, further comprising:
grounding one of the pair of plates; and
applying the square wave pulses to the other of the pair of plates.

22. The method as defined in claim 19, further comprising:
displaying the detected mass weights of the detected ions.

23. The method as in claim 19, further comprising:
spraying a heat responsive matrix material through an electric field by electro-deposition on the probe tip to form a thin layer of matrix material on the probe tip; and
the step of forming a layer of organic molecules includes applying the organic molecules to the matrix layer.

24. A method as in claim 23, wherein the molar weight organic molecules to matrix material is in the range of from 1:100 to 1:10,000.

* * * * *